US006512332B1

United States Patent
Nettleton

(10) Patent No.: US 6,512,332 B1
(45) Date of Patent: Jan. 28, 2003

(54) LASER PUMP ENERGY CONSERVATION

(75) Inventor: John E. Nettleton, Fairfax Station, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 73 days.

(21) Appl. No.: 09/605,995

(22) Filed: Jun. 29, 2000

(51) Int. Cl.⁷ .............................. H01J 7/44; H05B 41/38
(52) U.S. Cl. ........................ 315/58; 315/145; 315/193
(58) Field of Search .............................. 315/58, 193, 64, 315/312, 313, 291, 194, 182, DIG. 4, DIG. 5; 307/106, 108, 415; 358/214; 354/145.1, 62, 415

(56) References Cited

U.S. PATENT DOCUMENTS

| | | | | |
|---|---|---|---|---|
| 3,846,811 A | * | 11/1974 | Nakamura et al. | 315/150 |
| 4,390,992 A | * | 6/1983 | Judd | 372/70 |
| 4,549,091 A | * | 10/1985 | Fahlen et al. | 307/106 |
| 4,594,614 A | * | 6/1986 | Frank et al. | 348/97 |
| 4,677,636 A | * | 6/1987 | Laudenslager et al. | 372/68 |
| 5,017,834 A | * | 5/1991 | Farnswoth | 315/58 |
| 5,046,152 A | * | 9/1991 | Bartscher | 315/241 P |

\* cited by examiner

*Primary Examiner*—Don Wong
*Assistant Examiner*—Chuc Tran
(74) *Attorney, Agent, or Firm*—Milton W. Lee; John E. Holford

(57) ABSTRACT

A photon pump for a laser with a switch added to prevent capacitor discharge after the laser reaches maximum florescence.

9 Claims, 2 Drawing Sheets

LASER PUMP ENERGY CONSERVATION

BACKGROUND OF THE INVENTION

1. Field of the Invention

Lamp and diode pumped lasers particularly solid state lasers.

2. Description of Prior Art

Current fielded military laser range finders and target designators unfortunately waste considerable electrical energy supplied during their lasing process. This is true for both the flash lamp pumped and the laser diode pumped solid state laser systems. It is particularly devastating for the flash lamp pumped systems, since the conversion of electrical energy to laser energy is very poor to begin with. Due to the wideband spectrum of the flash lamp, only a small portion of the spectrum can be used to pump the solid state gain medium, the rest is just thermal waste. After the laser pulse peaks the lamp continues pumping although it is preferred that the laser pulse terminate sharply.

The excess electrical energy consumed by the laser devices leads to several undesirable consequences. The first consequence is the heavy drain on the power supply, which in the Army's field environment is a battery. This drain shortens the operational life of the battery. The soldier operating the laser device must carry this battery, and spares, to complete a normal mission. A second consequence of the excess electrical energy consumption during the lasing process of laser devices is that the majority, if not all, of the excess electrical energy gets converted into thermal waste or heat. The generation of excessive heat leads to a limitation of the laser process operation, i.e. the laser gets too hot to operate. This obviously has a negative impact on the soldier's mission. A third consequence of the excess electrical energy consumption during the lasing process is that it extends the re-charge time for the devices pulse forming network (PFN). The re-charge time may be shortened through other means such as increasing the size and/or number of the PFN capacitors, inductors, transformers, etc. but minimum size and weight of laser devices is a high priority for the military.

SUMMARY OF THE INVENTION

An optical output pulse maximum threshold anticipation and/or detection means is coupled to an electronic switch installed in the charging circuit of an optically pumped laser to prevent any further capacitor discharge after the laser pulse reaches a threshold optical output value.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
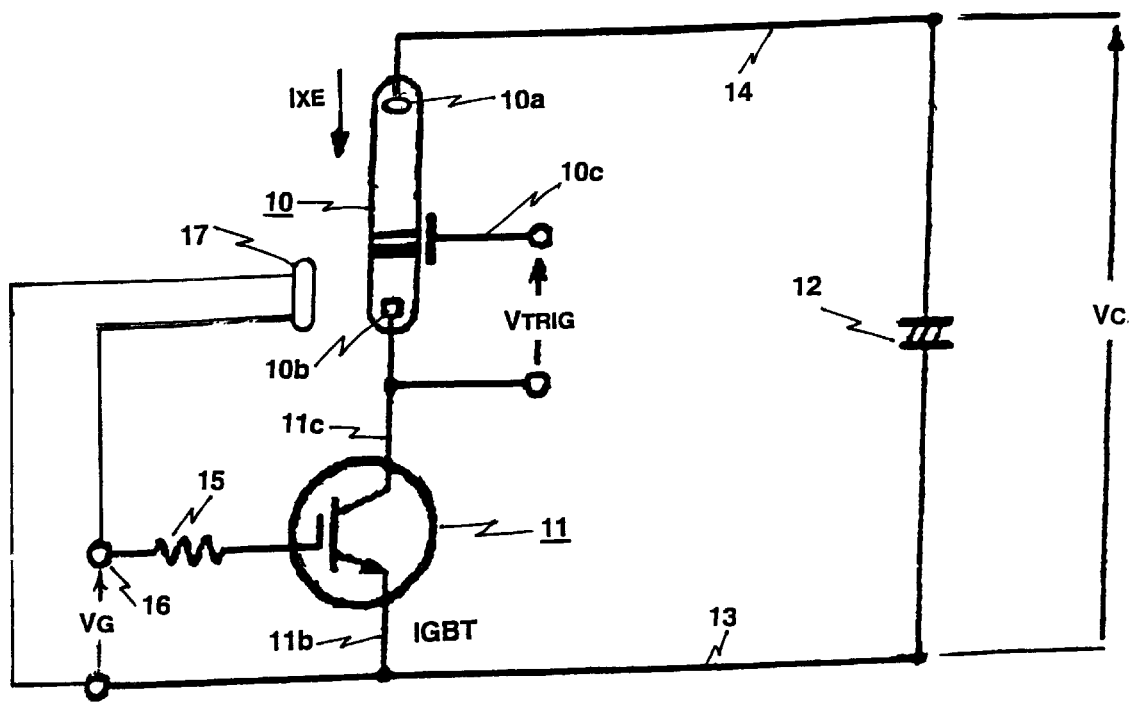
FIG. 1 shows a laser pump with a firing circuit according to the invention.

FIG. 1 shows the charging circuit for an optically pumped laser, modified by the addition of an insulated gate bipolar transistor 11 (IGBT). This circuit includes a pump 10 which may be xenon flash tube, as widely used in photography, with first and second widely spaced electrical terminals 10a and 10b, respectively. These terminals are normally just connected across the ground return terminal 13 and supply terminal 14 of a main charging capacitor. The tube presents a high resistance load to the capacitor 12, while charging, until the voltage $V_c$ begins to ionize the xenon gas and the resistance drops to a much lower value allowing the tube current $I_{XE}$ to flow. The initial ionization, and timing of this drop, is induced by means of trigger voltage $V_{TRIG}$ applied to a third terminal, inside or outside of the tube, but closer to the second terminal than the first. This voltage applied between the second and the third terminal will initiate ionization. Range finders apply a steep voltage pulse to this electrode to precisely mark initiation of the laser pulse. To this is now added the IGBT, model CT20ASJ-B, with its source 11c and drain 11b in series with the tube and capacitor. A steep voltage pulse Vg, slightly delayed with respect to the initiation pulse, applied to the gate terminal 16 of this normally high conductive device, through a current limiting resistor 15 renders it suddenly non-conductive. Thus the user can accurately mark the termination of the laser pulse. This can be achieved, if desired, by inserting some form of a pulse delay circuit (not shown) between the third tube electrode, when present, and the IGBT gate. Suitable delay devices include RC timing circuits, delay lines, piezoelectric devices and many others. It is preferred, however, to use an optical detector 17 exposed to the flash tube to supply a steep termination voltage pulse when the laser reaches a threshold that meets the requirements of the range finder.

Figure 2:
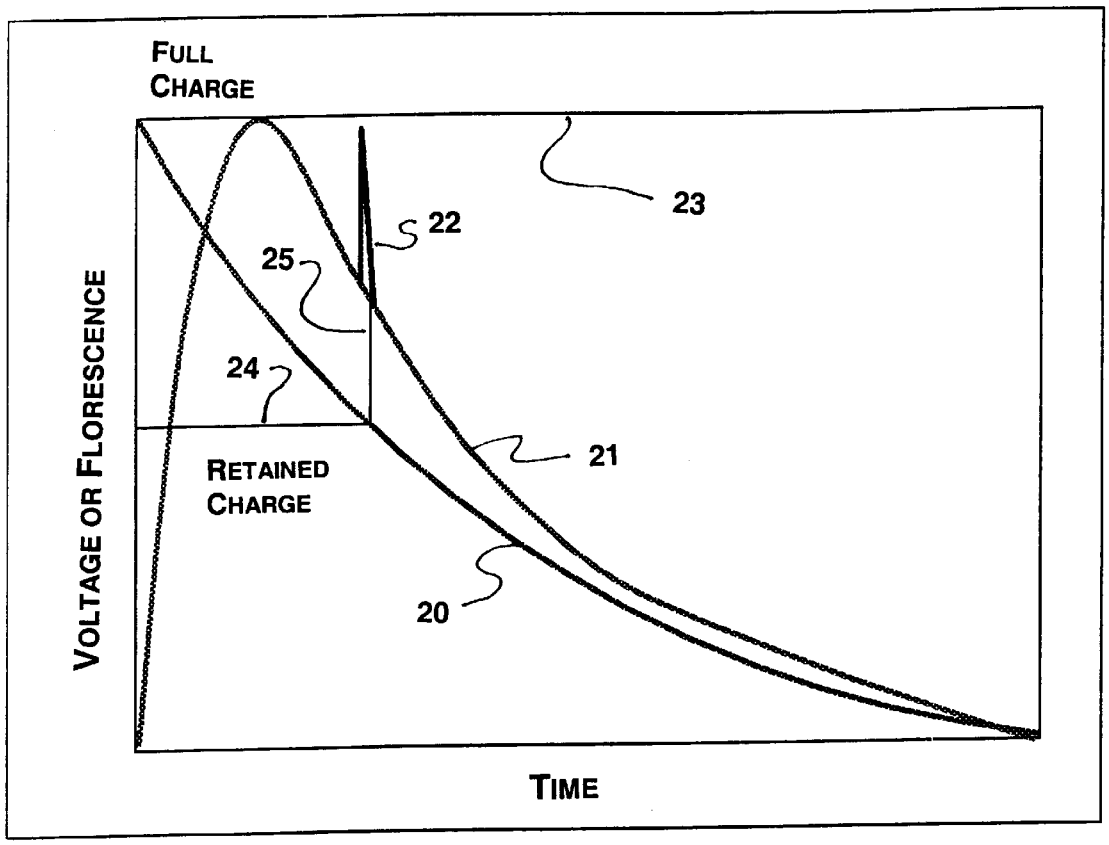
FIG. 2 shows a graph of the main capacitor discharge current, pump output florescence and the resultant laser pulse as as a function of time.

FIG. 2 shows a graph of the capacitor voltage 20, the flash tube florescence 21 and the lasers optical output 22 as a function of time. The capacitor voltage drops steadily from its maximum level 23 the instant pulse initiation is excited. Tube florescence rises quickly to a similar maximum level and slightly later drops steadily like the capacitor discharge. The laser pulse 22 occurs over a very short interval after a small drop in the florescence and capacitor voltage. The area under the capacitor voltage is directly proportional to the energy stored. By interrupting the discharge current slightly after the peak of the laser output, as indicated by marker 25 a large portion of the energy stored under the charge level marker 24 can be saved for the next laser output pulse. Since the output pulse covers such a brief time period a preselected delay that is too short might result in no pulse at all, thus defeating the purpose of the invention. Too long a delay wastes energy, also defeating the purpose of the invention. This is one reason that the self-timing optical pulse detector is preferred. The electronic switch (e.g. thyristor triac, gto, etc.) is capable of conducting large currents at high voltages and can be easily triggered off with low voltage high impedance detectors. Other means of switching may be designed to stop the pump's main capacitor from discharging, but the result is the same; electrical energy conservation.

This arrangement makes the development/fabrication of a very compact laser range finder feasible and, more importantly, can be a simple retro-fit to the military's existing laser devices inventory to improve on their operational performance. Size, weight, performance, length of operation and production costs are parameters that benefit by this invention.

The present invention may be used in solid state pulsed laser devices such as military laser range finders and laser designators; industrial laser cutters, welders, drillers and engravers; medical lasers in tumor removal, skin treatment (warts, birth marks, tattoos), eye surgery, and tooth decay. Additional advantages include reduced production costs, size and weight, due to smaller batteries and capacitors. Much used laser devices, such as laser designators, would be able to operate longer before requiring a cool-down period.

While this invention has been described in terms of preferred embodiments consisting of optically pumped lasers with solid state switches and detectors, those skilled in the art will recognize that the invention can be practiced with modification within the spirit and scope of the appended claims.

What is claimed is:

1. A laser pump for a range finder or other high power laser device, comprising:
   a flash-tube containing an inert ionizable gas for pumping a non-conductive laser medium, said flash-tube having at least first, second and third electrodes, said third electrode being much closer to said second electrode than said first electrode;
   a main fully charged high voltage capacitor having first and second terminals with first and second electrical connectors respectively coupling them to said first and second electrodes, said capacitor being the only current source connected to said first and second electrodes while said gas is ionized;
   a source of steep low voltage trigger pulses connected between said second and third electrodes to create temporary ionization in part of said gas in response to said trigger pulses, thereby permitting said capacitor to create a sustained discharge current through said ionized gas and causing a pulse of photon emission from said flash-tube over a band of frequencies including a frequency that induces lasing in said medium up to a maximum intensity threshold;
   an electronic pulse activated momentary normally-on switch means forming at least one of said connections between said terminals and electrodes to interrupt said discharge current in response to a termination voltage pulse; and
   an electronic coupling means interconnecting said flash-tube and said switch to detect the photon emission level of said lamp and to emit a termination pulse to turn off said switch means immediately as said photon emission approaches said threshold.

2. A laser pump according to claim 1; wherein said delay means further includes:
   a photon detector that generates said termination pulse in response to said maximum intensity threshold, such that said switch is turned off by said termination pulse without delay as said photon emission approaches said threshold.

3. A laser pump according to claim 1; wherein said coupling means further includes:
   an electronic delay circuit connected between said third electrode and said switch, such that said switch is turned off by a termination pulse, which is a very slightly delayed copy of one of said trigger pulses, as said photon emission approaches said threshold.

4. An optical photon lamp according to claim 1; wherein said trigger means further includes:
   a third electrode closer to said second electrode than said first electrode; and
   said delay means comprises an electronic delay circuit connected between said third electrode and said switch.

5. A laser pump according to claim 1; wherein said coupling means further includes:
   an electro-mechanical delay circuit connected between said third electrode and said switch, such that said switch is turned off by a termination pulse, which is a very slightly delayed copy of one of said trigger pulses, as said photon emission approaches said threshold.

6. A laser pump according to claim 1; wherein:
   said normally-on switch is an insulated gate bipolar transistor.

7. A laser pump according to claim 2; wherein:
   said normally-on switch is an insulated gate bipolar transistor.

8. A laser pump according to claim 3; wherein:
   said normally-on switch is an insulated gate bipolar transistor.

9. A laser pump according to claim 4; wherein:
   said normally-on switch is an insulated gate bipolar transistor.

* * * * *